(12) United States Patent
Keller et al.

(10) Patent No.: US 8,041,305 B2
(45) Date of Patent: Oct. 18, 2011

(54) SELECTIVELY RENDERING A COMMUNICATION AT A COMMUNICATION DEVICE

(75) Inventors: Matthew C. Keller, Algonquin, IL (US); Donald G. Newberg, Hoffman Estates, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 380 days.

(21) Appl. No.: 12/415,519

(22) Filed: Mar. 31, 2009

(65) Prior Publication Data

US 2010/0248654 A1    Sep. 30, 2010

(51) Int. Cl.
*H04B 5/00* (2006.01)
(52) U.S. Cl. .................... 455/67.11; 455/41.2
(58) Field of Classification Search ............ 455/41.2, 455/41.3, 90.2, 47, 500, 507, 516, 517, 524, 455/525, 526, 67.11
See application file for complete search history.

(56) References Cited

U.S. PATENT DOCUMENTS

| 6,633,757 | B1 | 10/2003 | Hermann et al. |
| 2006/0190974 | A1 | 8/2006 | Lee |
| 2008/0025535 | A1 | 1/2008 | Rajapakse |
| 2008/0147798 | A1 | 6/2008 | Paalasmaa et al. |
| 2009/0046677 | A1 | 2/2009 | Toledano et al. |

FOREIGN PATENT DOCUMENTS

| EP | 1024628 A1 | 8/2000 |
| KR | 1020060093803 A | 8/2006 |

OTHER PUBLICATIONS

PCT International Search Report Dated Oct. 19, 2010.

*Primary Examiner* — Stephen Jones
(74) *Attorney, Agent, or Firm* — Terri S. Hughes; Valerie M. Davis

(57) ABSTRACT

A method to selectively rendering a communication at a receiving communication device comprises receiving a communication and determining whether an association exists between the receiving communication device and a source of the communication. If an association does not exist between the receiving communication device and the source of the communication, rendering the communication at the receiving communication device or distributing the communication to the receiving communication device in order for the communication to be rendered at the receiving communication device. If an association does exist between the receiving communication device and the source of the communication, preventing the communication from being rendered at the receiving device.

20 Claims, 3 Drawing Sheets

SELECTIVELY RENDERING A COMMUNICATION AT A COMMUNICATION DEVICE

TECHNICAL FIELD

The present disclosure relates generally to communication systems, and in particular, it relates to a method to selectively render a communication at a communication device.

BACKGROUND

As public safety users increasingly use broadband devices, many users carry multiple communication devices. For example, broadband devices provide new portable data services, such as, public safety database query, video, and image sharing, as well as a supplementary push-to-talk (PTT) service. It is anticipated that the PTT service on the broadband device will be used as a backup to the primary PTT service on a narrowband device, for example, allowing the user to continue monitoring conversations even when there is a gap in narrowband coverage. It is likely in this use case that the broadband device will be provisioned with and affiliated with the same talkgroups as the narrowband device.

PTT communication services generally use a loudspeaker to play the audio received from a communication source in either point-to-point/private communications or group communications. Without special consideration, each communication device in the communication is treated individually. Thus, audio that is being transmitted by a user on one of the communication devices is played out of the loudspeaker on the user's other communication device(s).

While convenient, the audio being played back or rendered at the receiving communication device could be picked up by the open microphone of the transmitter, thus resulting in a feedback loop which could potentially cause the communication, for example, audio quality, to become unusable. In addition, when the source of the communication is transmitting on a narrowband device and the communication is being played back or rendered at a broadband device, the audio being played back will typically be delayed relative to the talker. It is often distracting for a talker to hear herself/himself talk with a delay. Further, the talker will typically start listening to herself/himself rather than focusing on what s/he is saying. In other words, the delay of playback on the broadband device is likely to be noticeable and could exacerbate this effect.

One solution is for a talker to manually turn down the volume of the loudspeaker on the broadband device so as not to hear herself/himself talk. Users, however, often forget to turn the volume back up after they finish talking, which can result in missed communications. Another example of this problem today is when officers carry a portable narrowband device, such as a portable radio, and turn its volume down when they enter a vehicle that also has a mobile radio affiliated to the same talkgroup as the portable device. The officer may forget to turn the volume back up on the portable narrowband device when leaving the vehicle.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

Figure 1:
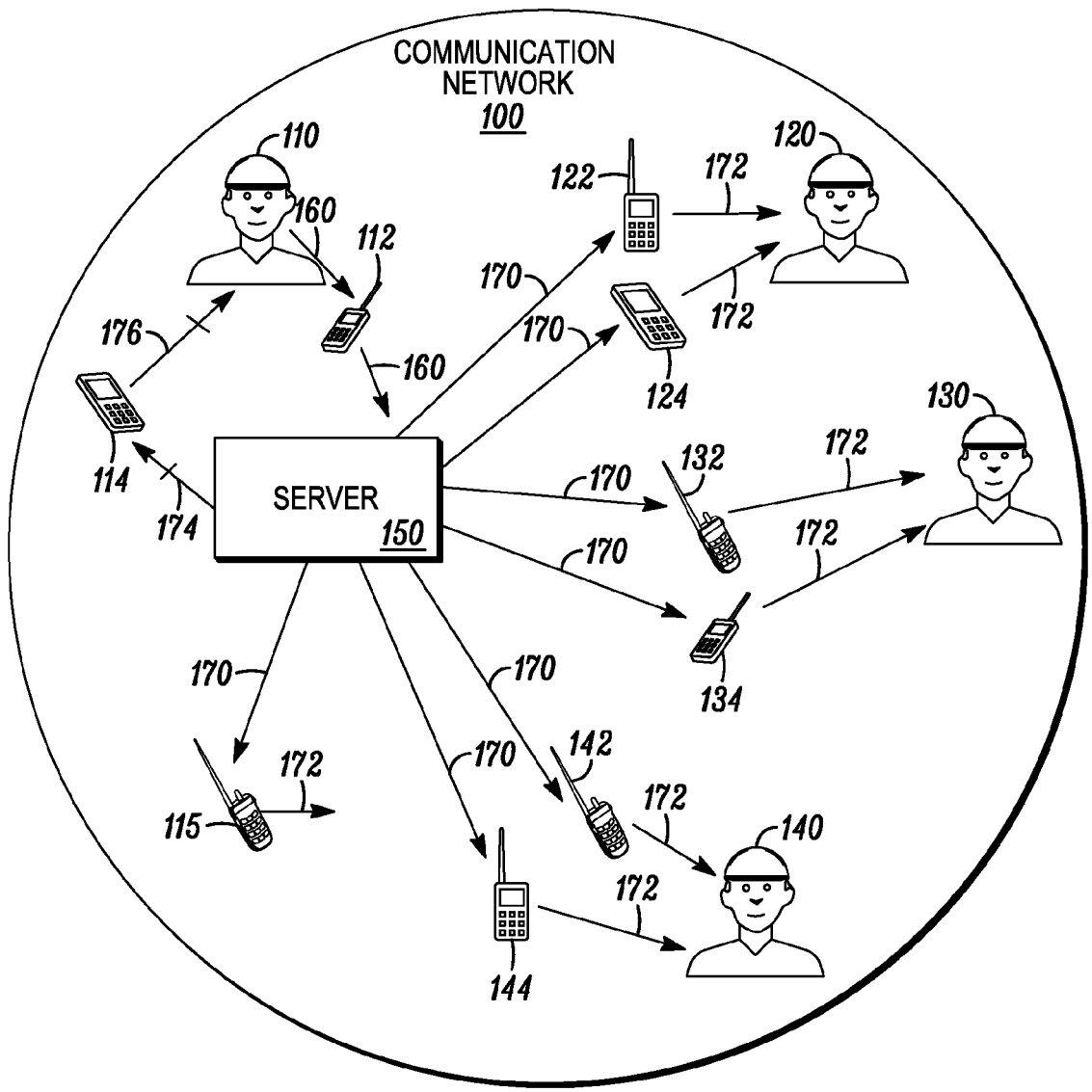
FIG. 1 is a diagram of a communication network in accordance with the principles of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description, drawings and claims do not necessarily require the order illustrated unless explicitly stated.

It will be further appreciated that certain actions and/or steps may be described or depicted in a particular order of occurrence while those skilled in the art will understand that such specificity with respect to sequence is not actually required.

Apparatus and method components have been represented, where appropriate, by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

The present disclosure discloses a method to selectively and automatically prevent the rendering of a communication at one communication device when the user is transmitting on an associated communication device that is nearby, thus preventing interference. Such a method preferably allows rendering of a communication at the first communication device (i.e. receiving communication device) when the user has finished transmitting on a second communication device or when the source of the communication is no longer in the same physical area or location as the receiving communication device. Thus, in one embodiment, a method for selectively rendering a communication at a receiving communication device comprises receiving a communication and determining whether an association exists between the receiving communication device and a source of the communication. If an association does not exist between the receiving communication device and the source of the communication, the communication is rendered at the receiving communication device. If an association does exist between the receiving communication device and the source of the communication, the communication is prevented from being rendered at the receiving communication device. In this embodiment, the method may occur at a receiving communication device in accordance with the principles of the present disclosure.

In an alternative embodiment, a method for selectively rendering a communication at a receiving communication device comprises receiving a communication, and determining whether an association exists between the receiving communication device and the source of the communication. If an association does not exist between the receiving communication device and the source of the communication, distributing the communication to the receiving communication device in order for the communication to be rendered at the receiving communication device. If an association does exist between the receiving communication device and the source of the communication, preventing the communication from being rendered at the receiving communication device. In this embodiment, the method may occur at a server in accordance with the principles of the present disclosure.

The source of the communication is identified by an identity of a transmitting communication device, its user, or the like. In one embodiment, the method of determining whether an association exists between the receiving communication device and the source of the communication comprises determining whether an identification of the receiving communication device is the same as or corresponds to an identification of the source of the communication. The identification of the source of the communication can be embedded in, for example, a Media Burst Grant, as disclosed in the Open Mobile Alliance Push-to-talk over Cellular standard. The identification can be, for example, a session initiation protocol (SIP) uniform resource identifier (URI), an alias, or a radio identifier, for example, an Association of Public Safety Communications Officials (APCO) Project 25 (P25) radio identifier, as disclosed in the Internet Engineering Task Force (IETF) Request for Comment (RFC) 3261 and the APCO P25 standards, as defined by Telecommunications Industry Association (TIA), respectively. The identification of the source of the communication can also be determined from information embedded in the communication and/or from control signaling for the communication.

In another embodiment, the method of determining whether an association exists between the receiving communication device and the source of the communication comprises determining whether the source of the communication and the receiving communication device are within a physical distance of each other. Thus, the communication may be prevented from being rendered at or distributed to the receiving communication device when the receiving communication device and the source of the communication are within, for example, twenty feet of each other.

In yet another embodiment, the method of determining whether an association exists between the receiving communication device and the source of the communication comprises determining whether the source of the communication and the receiving communication device are within a common physical area. Thus, the communication may be prevented from being rendered at or distributed to the receiving communication device when the receiving communication device and the source of the communication are, for example, in the same room.

In some embodiments, preventing the communication from being rendered at and/or distributed to a receiving communication device if the receiving communication device is within a physical distance or within a common physical area of the source of the communication may be applicable only if the receiving communication device has the same or corresponding identification as the source of the communication. In other embodiments, preventing the communication from being rendered at and/or distributed to a receiving communication device may be applicable if the receiving communication device is within a physical distance or within common physical area of the source of the communication, regardless if the receiving communication device has or does not have the same or corresponding identification as the source of the communication. In still other embodiments, rendering the communication at and/or distributing the communication to a receiving communication device may be applicable if the receiving communication device is not within a physical distance or within a common physical area of the source of the communication, regardless if the receiving communication device has the same or corresponding identification as the source of the communication.

It should be noted that the physical location, distance, or area outside of which communication will be rendered may be predetermined or may be dynamically specified or updated by the source of the communication or the communication network. It should also be noted that, in some embodiments, when the existence of an association is determined, preventing the communication from being rendered at the receiving communication device may comprise not converting the communication to an audio output at the receiving communication device. In other embodiments, preventing the communication from being rendered at the receiving communication device may comprise preventing the communication from being distributed to the receiving communication device.

As used herein, a communication device refers to both narrowband and broadband communication devices. As noted above, the source of the communication may be a communication device, as well as the receiving communication device. Narrowband communication devices include, but are not limited to, devices commonly referred to as access terminals, mobile radios, portable radios, mobile stations, wireless communications devices, user equipment, mobile devices, or any other narrowband communication device capable of operating in a wireless environment. Examples of digital narrowband communication systems include APCO P25 Phase I, APCO P25 Phase II, Terrestrial Trunked Radios (TETRA), Integrated Dispatch Enhanced Network (iDEN), and European Telecommunications Standards Institute (ETSI) digital mobile radio (DMR). Broadband communication devices include, but are not limited to, devices commonly referred to as mobile phones, cellular phones, personal digital assistants (PDAs), laptops, desktops, and any other device capable of receiving or accessing multimedia content from a broadband system. Digital broadband communication systems include, but are not limited to, Institute of Electrical and Electronics Engineers (IEEE) standards for wireless networking, such as 802.11 and 802.16, and other wireless technologies, such as evolution data optimized (EVDO), universal mobile telecommunications service (UMTS), high speed packet access (HSPA), and long term evolution (LTE) wireless technologies. Both narrowband and broadband communication devices are collectively referred to herein as "communication device(s)".

In addition, a communication includes, but is not limited to a transfer of audio, image, video, data and/or other media over one or more wired or wireless communication systems between two or more communication and/or infrastructure devices.

An association includes, but is not limited to, users and/or communication sources and/or communication devices having similar properties, physical location and/or areas, identifications, roles, membership groups, organizations, capabilities, user identifications, and/or the like.

Also, in the present disclosure, "rendering" refers to playing, making available, giving, supplying, causing to become, or otherwise allowing a communication to be played on or at a receiving communication device such that the communication is perceived by a user. A user typically refers to a human, but could also refer to a computer or other device able to perceive media.

"Distribution" refers to the transfer or transmission of a communication between a server and a communication device. A server is characterized by a grouping of logical functions which may be allocated to one or more physical wired or wireless infrastructure and/or communication devices. A server can receive communication (either control or media, e.g. data, voice (audio), video, etc.) in a signal from a wired or wireless communication device and transmit information in signals to one or more wired or wireless communication devices via a communication link. The server can be allocated to, but is not limited to, equipment commonly referred to as servers, controllers, call controllers, base stations, base transceiver stations, access points, routers, communication devices, or the like.

"Identification" as used herein may refer to either or both of the user identification and/or the communication device identification and can be, for example, in the form of a SIP URI, a radio identifier (e.g. a P25 radio identifier), an electronic serial number, an alias, or any other type of identification protocol that allows a source of the communication to be identified and compared to a receiving communication device identification. The identification, either user or device, can be embedded in a floor arbitration message, such as a Media Burst Grant message, or can be determined from information embedded in the communication and/or control signaling for the communication, for example, a SIP INVITE message. A user may register his/her identification on a communication device in many ways including, but not limited to, entering user credentials into the device, pre-configuring a communication device to be associated with a user, and/or having the communication device use an electronic means to acquire user credentials, for example, from a smart badge.

Referring now to the figures, and in particular FIG. 1, there is shown an exemplary diagram of a communication network in accordance with the principles of the present disclosure. Communication network 100 comprises both narrowband and broadband infrastructure devices and communication links, represented by a communication server 150, necessary to facilitate communications among users 110, 120, 130, and 140. In general, communication links (also referred to as channels) comprise the physical and/or non-tangible communication resources (e.g. radio frequency (RF) resources) over which a communication is transmitted within the communication network. Of course, while one embodiment of the communication network 100 is described with regards to FIG. 1, those skilled in the art will recognize and appreciate that the specifics of this illustrative example are not specifics of the disclosure itself and that the teachings set forth herein are applicable in a variety of alternative settings.

Each user in FIG. 1 has one or more communication devices. User 110 has communication devices 112, 114, and 115. User 120 has communication devices 122 and 124. User 130 has communication devices 132 and 134. User 140 has communication devices 142 and 144. It is understood that users may have more or less communication devices of each type and the number of users and communication devices listed are for example purposes only.

In the example of FIG. 1, user 110 provides an audio communication 160 and transmits the communication 160 on communication device 112 to a communication group comprised of users 110, 120, 130, and 140. A communication group is a group or collection of members, subscribers, and/or communication device users (collectively referred to herein as "users") configured for group communications over a communication system. While the present disclosure uses, as an example, a group communication, it is understood that the present disclosure discussed herein also applies to one-on-one communications.

In one example, an association is determined to exist between the receiving communication device and the source of the communication if the receiving communication device is within ten feet of the source of the communication. Thus, in this example, the communication is distributed, directly or indirectly, to the communication devices 122, 124, 132, 134, 142, 144 of users 120, 130, and 140, as illustrated at 170. In addition, the communication is distributed to communication device 115 of user 110. The communication devices render the communication to their respective users, as referenced at 172. In the example of FIG. 1, however, the communication is not distributed to and/or rendered at communication device 114 of user 110 (as shown at 174, 176 respectively). Communication device 114 has an association with communication device 112 or user 110 (e.g. communication device 114 is within ten feet of communication device 112 or user 110 (source of the communication)). Communication device 115, on the other hand, does not have an association with communication device 112. Even though communication device 115 belongs to the same user 110, it is not within ten feet of communication device 112. Since communication devices 112 and 115 do not have an association, the communication is distributed to and/or rendered at communication device 115.

Figure 2:
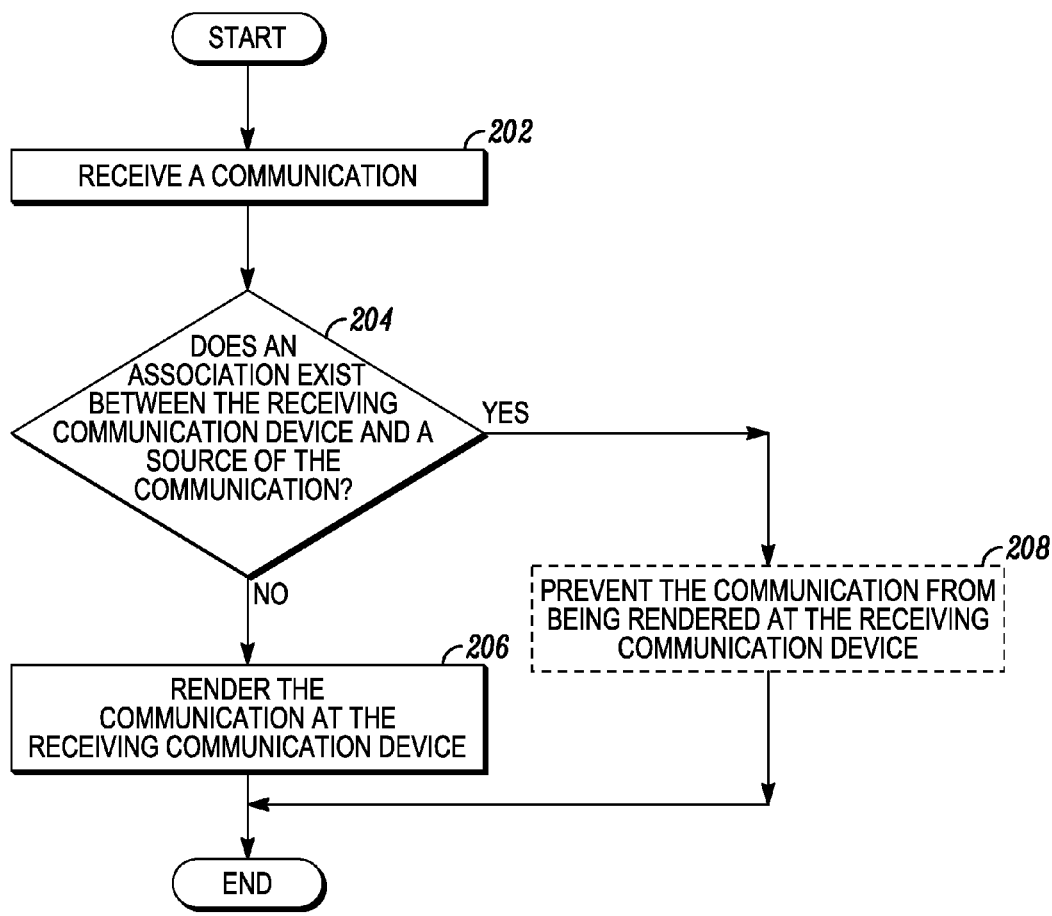
FIG. 2 is a flowchart of an embodiment of the present disclosure.

Referring now to FIG. 2, an embodiment of the present disclosure is described in which a receiving communication device receives a communication, directly or indirectly, from a source of the communication. A receiving communication device receives a communication, at block 202.

The receiving communication device determines whether a communication is or will be rendered at the receiving communication device based on whether an association exists with the source of the communication. Thus, in this example, the receiving communication device determines whether an association exists between the source of the communication and the receiving communication device, at block 204.

In one embodiment, the existence of an association is determined by whether the identification of the source of the communication (e.g. the identification of the communication device, the user of the communication device, or the like) matches the identification of the receiving communication device (e.g. the identification of the communication device, the user of the communication device, or the like). The identification of the source of the communication may be, as discussed above, embedded in a Media Burst Grant, a SIP URI, a radio identifier, or the like, determined from information embedded in the communication, and/or determined from control signaling for the communication. Thus, if the identifications of the receiving communication device and the source of the communication are the same or correspond to each other, an association exists. On the other hand, if the identifications are not the same or do not correspond with each other, an association may not exist.

In another embodiment, the existence of an association may be determined by the physical distance between the receiving communication device and the source of the communication. For example, if the receiving communication device and the source of the communication are within, for example, five feet of each other, an association exists. If, however, in the same example, the receiving communication device and the source of the communication are greater than five feet apart, an association may not exist.

In another embodiment, the existence of an association may be determined by a common physical area. If the receiving communication device and the source of the communication are within a common physical area, for example, within a three foot radius of a point of reference (e.g. incident scene, source of the communication, or the like), an association may exist. If the receiving communication device and the source of the communication are not within the common physical area, for example, greater than a three foot radius apart, an association may not exist. Another example of a common physical area could be a room in a building.

If an association does not exist between the receiving communication device and the source of the communication, then the communication is rendered at the receiving communication device, at block 206. If, on the other hand, an association does exist between the receiving communication device and the source of the communication, then the receiving communication device will prevent the communication from being rendered at the receiving communication device, at block 208. For example, the receiving communication device may prevent the communication from being rendered at the receiving communication device by muting the audio on the receiving communication device, not converting the communication to an audio output at the receiving communication device, or the like.

Figure 3:
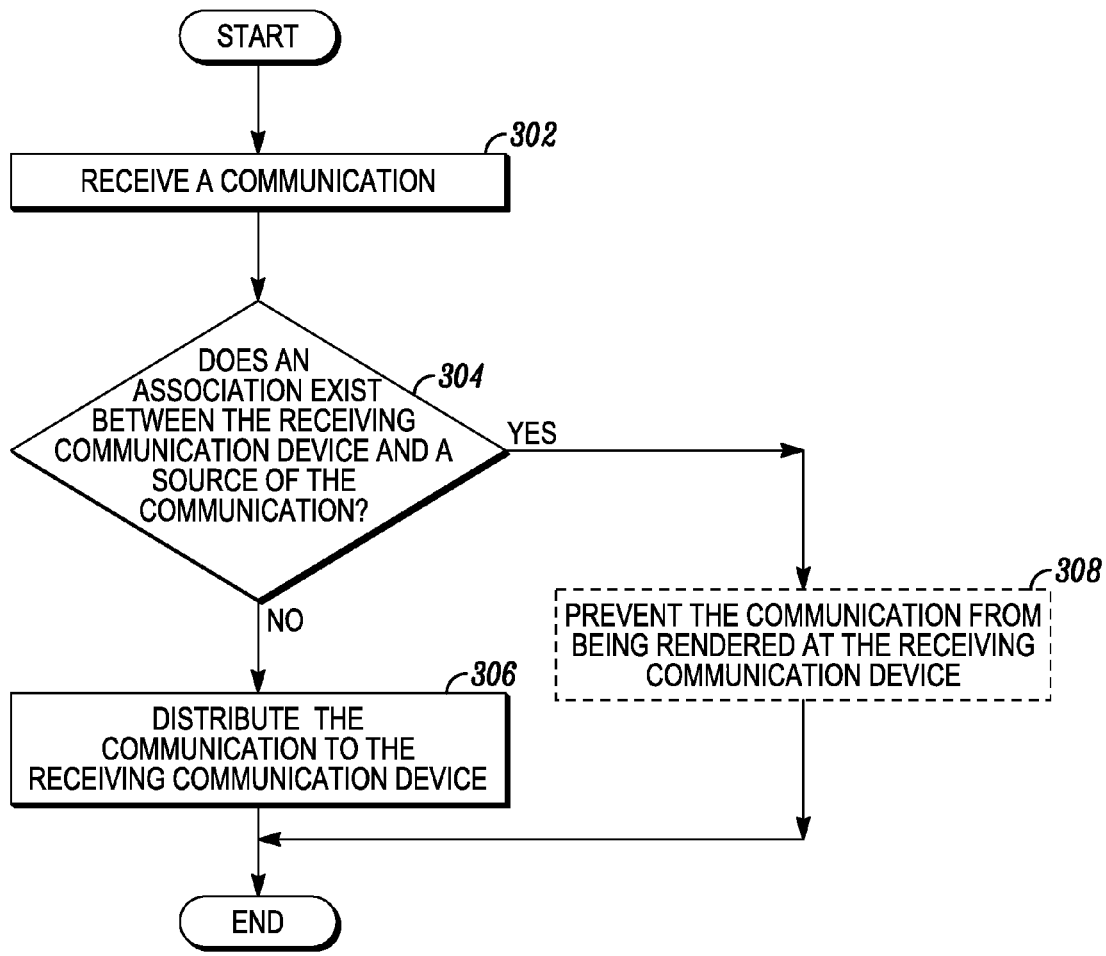
FIG. 3 is a flowchart of another embodiment of the present disclosure.

Another embodiment of the present method is illustrated in FIG. 3, wherein a communication is received, either directly or indirectly, from a source of the communication, at block 302. The communication in the present example is received by a server, however, those skilled in the art will recognize and appreciate that the specifics of this illustrative example are not specifics of the disclosure itself and that a variety of devices may be utilized and are within the scope the presently claimed disclosure.

The existence of an association is determined between the source of the communication and the receiving communication device, at block 304. For example, the existence of an association may be determined by determining whether the source of the communication and the receiving communication device have the same or corresponding identifications, if they are within a physical distance of each other, and/or if they are within a common physical area, as discussed above. If an association does not exist, the communication is distributed to the receiving communication device in order for the communication to be rendered at the receiving communication device, at block 306. If an association does exist, however, the server prevents the communication from being rendered at the receiving communication device by, for example, not distributing the communication to the receiving communication device, setting a bit in the communication to indicate that the communication should not be rendered at the receiving communication device, signaling the receiving communication device not to render the communication, or the like, at block 308.

In the foregoing specification, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus.

An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for indicating status of channels assigned to a talkgroup described herein. The non-processor circuits may include, but are not limited to, a radio receiver, a radio transmitter, signal drivers, clock circuits, power source circuits, and user input devices. As such, these functions may be interpreted as steps of a method to perform the indicating of status of channels assigned to a talkgroup described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for selectively rendering a communication at a receiving communication device comprising:
   receiving a communication;
   determining whether an association exists between the receiving communication device and a source of the communication; and
   if an association does not exist between the receiving communication device and the source of the communication, rendering the communication at the receiving communication device.

2. The method of claim 1 wherein determining whether the association exists between the receiving communication device and the source of the communication comprises determining whether the source of the communication and the receiving communication device are within a physical distance of each other.

3. The method of claim 1 wherein determining whether the association exists between the receiving communication device and the source of the communication comprises determining whether the source of the communication and the receiving communication device are within a common physical area.

4. The method of claim 1 wherein the source of the communication is one of a transmitting communication device or an identity of a person.

5. The method of claim 1 further comprising, if an association does exist between the receiving communication device and the source of the communication, preventing the communication from being rendered at the receiving communication device.

6. The method of claim 5 wherein the step of preventing the communication from being rendered at the receiving communication device comprises not converting the communication to an audio output at the receiving communication device.

7. The method of claim 1 wherein determining whether an association exists between the receiving communication device and the source of the communication comprises determining whether an identification of the receiving communication device corresponds to an identification of the source of the communication.

8. The method of claim 7 wherein the identification of the source of the communication is embedded in a Media Burst Grant.

9. The method of claim 7 wherein the identification of the source of the communication is one of a session initiation protocol (SIP) uniform resource identifier (URI) or an Association of Pubic Safety Communications Officials (APCO) Project 25 (P25) radio identifier.

10. The method of claim 7 wherein the identification of the source of the communication is determined from information embedded in the communication.

11. The method of claim 7 wherein the identification of the source of the communication is determined from control signaling for the communication.

12. A method for selectively rendering a communication at a receiving communication device comprising:
   at a server:
      receiving a communication;
      determining whether an association exists between the receiving communication device and a source of the communication; and
      if an association does not exist between the receiving communication device and the source of the communication, distributing the communication to the receiving communication device in order for the communication to be rendered at the receiving communication device.

13. The method of claim 12 wherein determining whether the association exists between the receiving communication device and the source of the communication comprises determining whether the source of the communication and the receiving communication device are within a physical distance of each other.

14. The method of claim 12 wherein determining whether the association exists between the receiving communication device and the source of the communication comprises determining whether the source of the communication and the receiving communication device are within a common physical area.

15. The method of claim 12 further comprising, if an association does exist between the receiving communication device and the source of the communication, preventing the communication from being rendered at the receiving communication device.

16. The method of claim 12 wherein the source of the communication is one of a transmitting communication device or an identity of a person.

17. The method of claim 12 wherein determining whether an association exists between the receiving communication device and the source of the communication comprises determining whether an identification of the receiving communication device is the same as an identification of the source of the communication.

18. The method of claim 17 wherein the identification of the source of the communication is embedded in a Media Burst Grant.

19. The method of claim 17 wherein the identification of the source of the communication is one of a session initiation protocol (SIP) uniform resource identifier (URI) or an Association of Pubic Safety Communications Officials (APCO) Project 25 (P25) radio identifier.

20. The method of claim 17 wherein the identification of the source of the communication is determined from one of information embedded in the communication or control signaling for the communication.

* * * * *